United States Patent
Hollars et al.

(10) Patent No.: US 7,703,640 B1
(45) Date of Patent: Apr. 27, 2010

(54) HEAT ACTUATED PUNCTURING MECHANISM FOR A COMPRESSED GAS CARTRIDGE

(76) Inventors: Anthony Scott Hollars, Genuine Innovations, Inc., 2700 E. Bilby Rd., Tuscon, AZ (US) 85706; Thomas F. Janecek, 2303 W. Lantern La., Flagstaff, AZ (US) 86001

( * ) Notice: Subject to any disclaimer, the term of this patent is extended or adjusted under 35 U.S.C. 154(b) by 934 days.

(21) Appl. No.: 11/344,322

(22) Filed: Feb. 1, 2006

(51) Int. Cl.
*B67D 7/00* (2006.01)
(52) U.S. Cl. .................. 222/5; 222/54; 169/57; 169/72; 169/75; 236/90
(58) Field of Classification Search .......... 222/5, 222/54, 3; 236/90; 169/57, 72, 75
See application file for complete search history.

(56) References Cited

U.S. PATENT DOCUMENTS

| | | | | |
|---|---|---|---|---|
| 1,510,843 A | * | 10/1924 | Hawkins | 169/28 |
| 2,412,491 A | * | 12/1946 | Angell | 169/26 |
| 2,759,546 A | * | 8/1956 | Zabriskie | 169/26 |
| 3,291,216 A | * | 12/1966 | Merrill | 169/39 |
| 3,682,251 A | * | 8/1972 | Livingston | 169/37 |
| 4,299,289 A | * | 11/1981 | Kato | 169/57 |
| 4,498,605 A | * | 2/1985 | Mackal et al. | 222/5 |
| 5,012,954 A | * | 5/1991 | Will | 222/5 |
| 6,123,227 A | * | 9/2000 | Umeda | 222/5 |
| 6,585,054 B1 | * | 7/2003 | Thomas et al. | 169/37 |

* cited by examiner

*Primary Examiner*—Kevin P Shaver
*Assistant Examiner*—Andrew P Bainbridge
(74) *Attorney, Agent, or Firm*—Dale F. Regelman; Quarles & Brady LLP

(57) ABSTRACT

The present invention offers a solution to the potential hazards associated with an accidental overheating of a full compressed gas cartridge, by offering an automatic heat-actuable pressure discharge system. The compressed gas cartridge is protected from dangerous explosions caused by excessive heat by the use of a lance that pierces the compressed gas cartridge safely when a spring loaded hammer is released from its constraints when a length of heat sensitive material fails in the presence of excessive heat, thereby avoiding a very serious fire hazard.

4 Claims, 3 Drawing Sheets

HEAT ACTUATED PUNCTURING MECHANISM FOR A COMPRESSED GAS CARTRIDGE

CROSS REFERENCE TO RELATED APPLICATIONS

Not applicable.

FEDERALLY SPONSORED RESEARCH

Not applicable.

REFERENCE TO A MICROFICHE APPENDIX

Not applicable.

FIELD OF THE INVENTION

The present invention relates to the field of portable compressed gas cartridge dispensers comprising heat-actuable pressure relief systems.

BACKGROUND OF THE INVENTION

Hereinafter, a compressed gas cartridge will be referenced as a cgc.

Many people use compressed gas dispensers daily in a variety of applications such as medical, commercial, and domestic. Common uses of such a dispenser are for use in the medical industry. Exemplary medical industry devices include: pneumatic inflation, cryogenic-related devices, pneumatic staple devices and dry powder and wet inhalers.

Good hospital hygiene practices frequently include incineration of used disposable medical devices in order to minimize the hazards of infectious waste. CGC's, particularly those filled with compressed carbon dioxide or nitrous oxide retain in the range of 700 to 900 psi, depending on room temperature. Introduced heat quickly raises cgc pressure. For example, raising a cgc of carbon dioxide to 140 degrees Fahrenheit increases the cgc pressure to about 3400 psi while a cgc of carbon dioxide at 160 degrees Fahrenheit yields about 4200 psi. These temperatures/pressures exceed cartridge manufacturer's specified safe temperature range and have now become a dangerous pressure vessel waiting to violently explode. Typically, a steel cgc will not gradually release high pressure because the cartridge sealing cap is welded into place to form an all metal sealed pressure vessel. Instead, the sudden release of pressure upon explosion causes the cgc to become a projectile, randomly sending shrapnel into the air, and creating dangerously high decibel noise, capable of permanently damaging one's ears.

Some incinerators are armored to protect personnel and equipment should a full cgc accidentally be added to the furnace. Incinerator temperatures can quickly bring a cgc temperature up to dangerous levels in minimal time, perhaps within seconds of introduction to the heat.

There are many commercial and domestic uses of cgc's and a few exemplary applications include: tire inflation, portable pneumatic tool applications, actuators—by heat, manual, electronic, and other methods, air guns, life preserver inflation, aircraft redundant pneumatic systems, and more.

Some of these applications are potentially subjected to intense heat that could result in dangerous explosion of a cgc thus causing user injury and property damage. For example, a cyclist may leave a cgc dispenser in a car on a hot day with the windows rolled up. CGC's can, and do, occasionally rapidly explode in a hot vehicle which is overall, an undesirable event. A portable pneumatic tool may be left out in the sunlight for a period of time. The intense heat buildup can cause a cgc to reach dangerous temperatures.

In summary, there has been a long felt need for a safety feature that prevents a cgc from reaching dangerously high pressures should a cgc be subjected to high heat while installed in a dispenser head.

Two distinct types of cgc's are currently common—threaded neck portion and non-threaded neck portion. Many current art compressed gas dispensers, particularly the models manufactured by Genuine Innovations, Inc. in Tucson, Ariz. U.S.A. are manufactured to dispense a non-threaded neck compressed gas cartridge, dispense a threaded neck compressed gas cartridge, or capable of dispensing both species within the same dispenser.

One feature of current art compressed gas dispensers is a lance housing that has been used in part to contain the high pressure from a compressed gas cartridge. Historically, lance housings have been manufactured from metal such as brass. A lance housing also provides an excellent recess or pocket for a seal that is used to contain the compressed gas in a lanced cartridge and studying the prior-art exemplifies many methods of virtually accomplishing the same sealing result. A lance housing can feature internal threads that are used to mate with a compressed gas cartridge also exhibiting a threaded neck portion and a lance housing sometimes exhibits no threads to mate with a compressed gas cartridge and can accept only non-threaded varieties.

U.S. Pat. No. 6,843,388 by Hollars titled Compressed gas cartridge dispensing system allowing interchangeable use of different capacity compressed gas cartridges and novel storage feature teaches some methods of how a non-threaded neck compressed gas cartridge can be dispensed as well as teaches an additional method of how a threaded neck compressed gas cartridge can be dispensed. Additionally, the terminology from the U.S. Pat. No. 6,843,388 is carried over into this application in an effort to maintain consistency for ease of understanding.

The preferred embodiment and alternative embodiments will be exemplified in the following paragraphs and in the FIGS. The following embodiments will describe the aforementioned prior-art and the present invention. Additionally, with the aid of figures, one skilled in the art will be able to understand and appreciate the scope of the exemplary embodiments to follow.

OBJECTS AND ADVANTAGES

Accordingly, several objects and advantages of the present invention will be presented in the following paragraphs followed by a thorough disclosure of each accompanying embodiment in the DETAILED DESCRIPTION.

In light of the above-mentioned problems, it is therefore an object of the present invention to provide a simple method of manufacturing a compressed gas dispenser featuring a reliable heat-actuable pressure discharge feature.

Additionally, another object of the present invention is to provide a cgc dispenser having means for a flame-actuable pressure discharge feature.

It is another object of the present invention to utilize as little metal as possible in a lance housing and incorporate as many features and components as possible out of injection moldings, particularly for affordable manufacturing reasons and reduced components.

Further objects and advantages will become apparent in the following paragraphs. Solely and in combination, the above objects and advantages will be illustrated in the exemplary figures and accompanying embodiments to follow.

BRIEF DESCRIPTION OF THE DRAWINGS

The figures are exemplary of different embodiments of the present invention. Each illustration conveys the invention and is not to be considered as limiting, rather, exemplary to the scope and spirit of the present invention. Like components in the figures share identical numbering.

DETAILED DESCRIPTION

Figure 1:
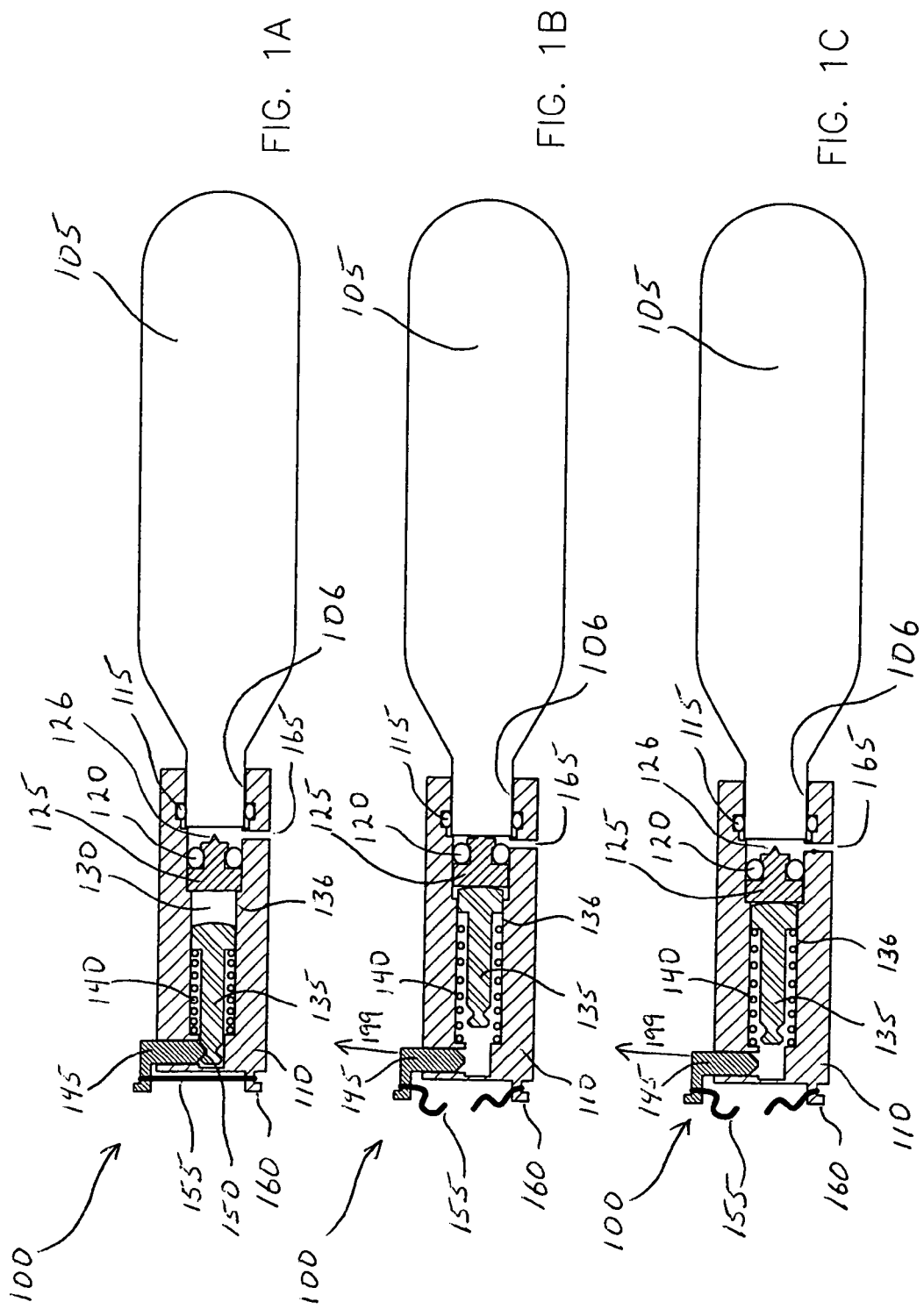
FIG. 1A illustrates a partial cross-section view of part of an exemplary compressed gas cartridge dispenser comprising a heat and/or flame actuable pressure discharge puncturer in a first position, in accordance with an embodiment of the current invention.
FIG. 1B illustrates a partial cross-section view of part of an exemplary compressed gas cartridge dispenser comprising a heat and/or flame actuable pressure discharge puncturer in a second position, in accordance with an embodiment of the current invention.
FIG. 1C illustrates a partial cross-section view of part of an exemplary compressed gas cartridge dispenser comprising a heat and/or flame actuable pressure discharge puncturer in a third position, in accordance with an embodiment of the current invention.

The following paragraphs will detail several modes including the best mode of the present invention. The exemplary figures and description of the invention as it is exemplified in each figure is representative of the current invention and the scope of the invention disclosure is not intended to be limited by the exemplary teachings. One skilled in the pertinent art realizes that the embodiments to follow may reasonably be combined and/or modified without deviating from the intended spirit of the present invention. Like physical structure in different figures share the same identifying numbers.

FIG. 1A illustrates a partial cross-section view of part of an exemplary compressed gas cartridge (cgc) dispenser 100 in a first position comprising a non-threaded cgc functionally situated in a cgc dispenser, in accordance with the present invention. A cgc 105 situates within a lance housing 106 comprising a cgc seal 115 capable of retaining the pressure contained within a cgc upon harnessing in cgc dispenser 100. Exemplified in a cgc dispenser body 110 is a floatable cartridge piercing lance 125 featuring a rigid pierce tip 126. A piercing lance seal 120 circumferentially situates around cartridge piercing lance 125 and maintains piercing lance 125 in position. Not illustrated in this exemplary figure is a cgc retainer commonly referred to as a cgc cup. A cgc cup maintains cgc 105 in position with cgc dispenser 100. Typical attachment means for cgc cup to cgc dispenser is a threadable connection and can be seen in many exemplary reference works such as in U.S. Pat. No. 6,843,388 to Hollars, filed Jul. 22, 2002.

Also contained within cgc dispenser 100 is a lance hammer 135 situated within a hammer bore 136 that is an integral feature within cgc dispenser body 110. A hammer spring 140 centers around lance hammer 135 and is exemplified in a compressed position in FIG. 1. A beveled retaining feature 150 coexists between the top end of lance hammer 135 and a hammer retainer 145. Preferably, beveled retaining feature 150 is angled to approximately 45 degrees for both mating components.

A tensile line 155 retains hammer retainer in position with lance hammer 135. Preferably, tensile line 155 is comprised of a monofilament or braided element composition. Such exemplary line compositions can be nylon monofilament or polyethylene braided. Tensile line 155 wraps around and/or is retained by a protrusion 160.

A flame or high heat introduced to tensile line 155 will quickly allow line failure thus allowing lance hammer 135 to travel along hammer acceleration zone 130 thus ultimately striking cgc lance 125 and driving into cgc 105.

A user is capable of manually lancing a cgc upon breaking tensile line 155 through heat or cutting or by applying an in-line puncturing force 199 (FIG. 1B) onto protrusion 160 thus shifting hammer retainer 145 such that lance hammer 135 is no longer retained by beveled retaining feature 150. In exemplary FIG. 1, actuation hardware is not illustrated, rather illustrated with arrows, and can be comprised of simple fulcrumbed thumb levers to solenoid actuators or any complexity device in between.

FIG. 1B illustrates dispenser 100 in a second position such that piercing lance 125 has punctured cgc 105. A lanced cgc releases pressurized gas, driving piercing lance away from cgc 105 (shown in FIG. 1C as a third position) allowing compressed gas out through an exit port 165 that fluidly connects to any device or attachment desired in connection.

Even though a non-threaded compressed gas cartridge is exemplified in FIG. 1, a slightly different embodiment not illustrated is a cgc having a threaded neck portion adaptable to such a dispenser. The lance housing would be threaded in this embodiment thereby not requiring use of a cartridge-retaining container.

Figure 2:
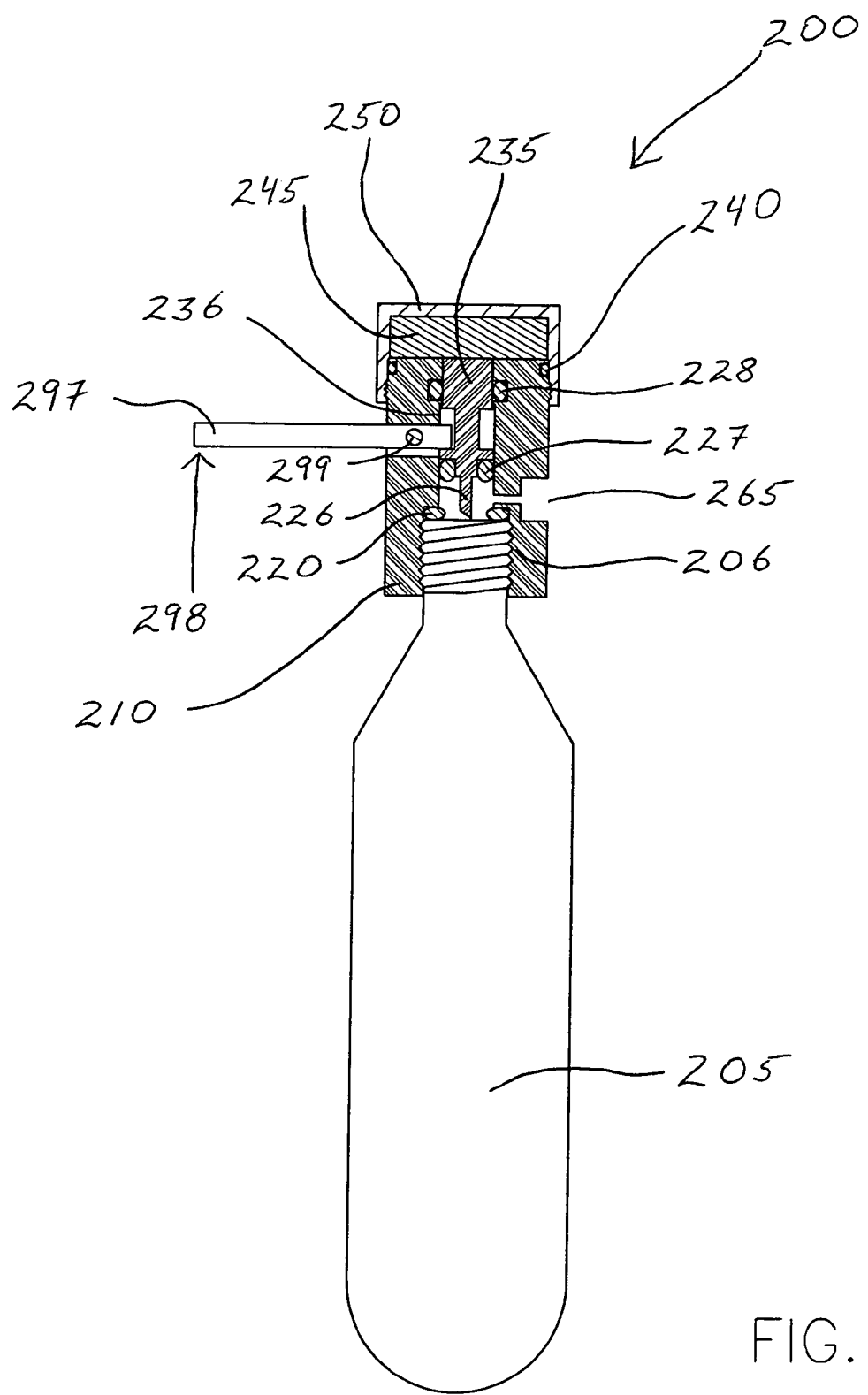
FIG. 2 illustrates a partial cross-section view of part of an exemplary compressed gas cartridge dispenser comprising a heat expandable pressure discharge puncturer, in accordance with an embodiment of the current invention.

FIG. 2 illustrates a partial cross-section view of part of an exemplary compressed gas cartridge dispenser 200 comprising a heat expandable pressure discharge puncturer, in accordance with an embodiment of the current invention. Illustrated in this embodiment is a threaded neck portion cgc 205 threaded into a threaded lance housing 206 located distally at a cgc dispenser body 210. A piercing lance seal 220 abuts the puncturable face of cgc 205. A cgc lance 226 situates within a lance driver 235 that is allowed to translate within a driver bore 236 that is an integral feature of cgc dispenser body 210. A lower lance driver seal 227 and an upper lance driver seal 228 maintain lance driver 235 in place as well as provide sealing on each end. A cgc dispenser cap 250 is shown threadably attached to cgc dispenser body 210. A reservoir 245 is contained by cgc dispenser cap 250 and is sealed from leaking by a cap seal 240.

Certain applications may benefit from a slower reacting, heat-actuable pressure release system. Intuitively, this embodiment is probably slower to respond to a heat application than the embodiment illustrated in FIG. 1. As reservoir 245 melts from high heat, the wax expands thus driving lance driver 235 toward cgc 205. Current technology in the wax actuation industry allows one to dope the paraffin so that it melts (and expands) and a predictable temperature. Two common terms for this type of actuator can be a wax motor or thermoactuator and has seen great success in appliance applications among other industries.

Also in accordance with an embodiment of the present invention, the wax actuator can be combined with a heat source. A temperature sensor can provide an actuation means, either mechanical or electrical, to a switch that can heat the paraffin quickly through battery/resistance, chemical, environmental, or other means.

Figure 3A:
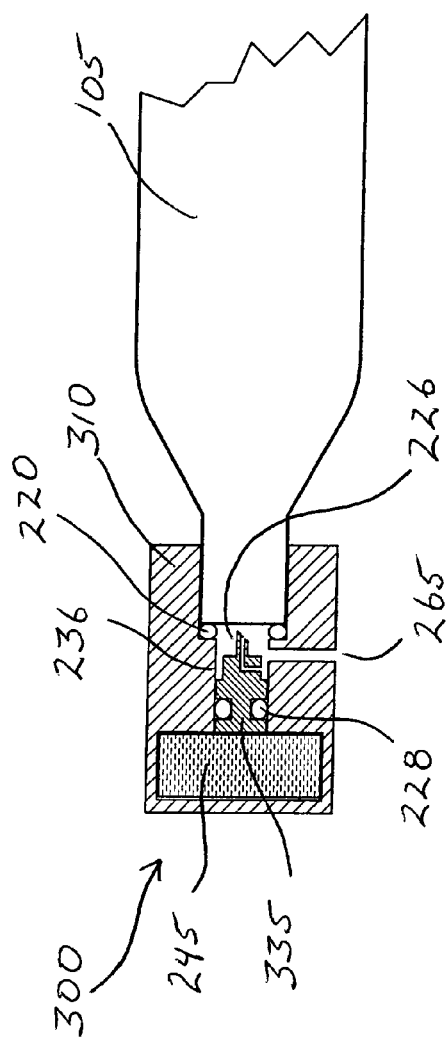
FIG. 3A illustrates a partial cross-section view of part of an exemplary compressed gas cartridge dispenser comprising a heat expandable pressure discharge puncturer in a first position, in accordance with an embodiment of the current invention.
Figure 3B:
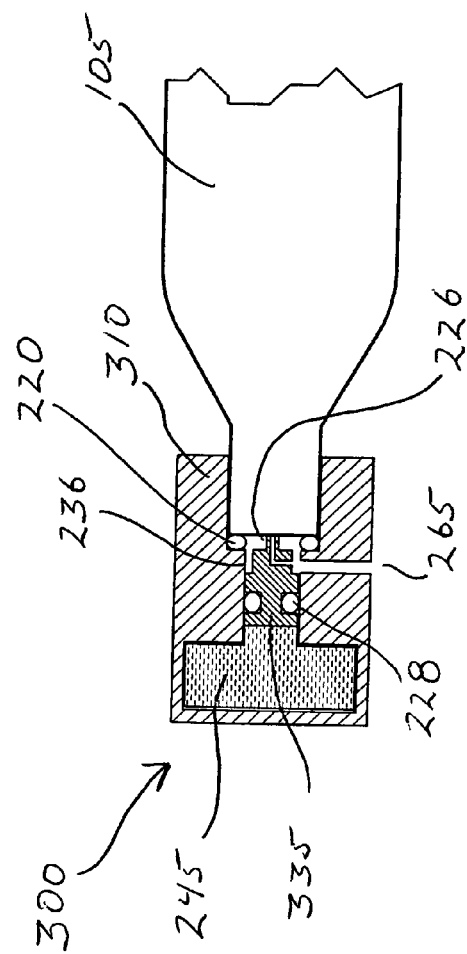
FIG. 3B illustrates a partial cross-section view of part of an exemplary compressed gas cartridge dispenser comprising a heat expandable pressure discharge puncturer in a second position, in accordance with an embodiment of the current invention.

An additional embodiment of the present invention combines the spring biased lance hammer mechanism similar to that exemplified in FIGS. 1A-1C and the paraffin wax actuator exemplified in FIGS. 2, 3A-3B. An expanding wax reservoir can easily be designed to actuate a hammer retainer, thus releasing a lance hammer to rapidly relieve the high pressure in a cgc. Again, the paraffin can be tailored to melt, thus expand at a predictable temperature.

Intentionally dispensed fluid from cgc 205 or by heat-puncturing exits dispenser 200 through an exit port 265 and fluidly connects to any device or attachment desired in connection.

A puncturer 297 rotated about a post 299 allows one to manually puncture lance driver 235 toward cgc 205 and puncture cgc 205 with lance 226. One skilled in the art could conceivable attach puncturer 297 to a host of manual or automated triggering devices to increase versatility of dispenser 200.

An alternative embodiment that can be exemplified from FIG. 2 utilizes a non-threaded neck cgc and utilizes a cgc cup to hold cgc into place.

FIG. 3A illustrates a partial section view of an exemplary heat expandable pressure discharge dispenser 300 in a first position, in accordance with an embodiment of the present invention. Illustrated in FIGS. 3A and 3B are non-threaded cgc's 105 but threaded cgc's are equally intended to be within the scope of this embodiment. A monolithically formed dispenser body 310 houses reservoir 245 of paraffin wax or similar expandable substance. Abutted to wax in reservoir 245 is a slideable lance 335, sealed in driver bore 236 by lance seal 228.

Upon heating, wax in reservoir 245 expands thus displacing slideable lance 335 along driver bore 236 and punctures cgc 105 with piercing tip 226.

To the extent that such modifications and variations do not depart from the spirit of the invention, they are intended to be included within the scope thereof which is limited only by a fair assessment of the following claims.

Having fully described the present invention and alternately preferred embodiments thereof in such clear and concise terms as to enable those skilled in the art to understand and practice the same, the invention claimed is:

1. A compressed gas cartridge dispenser system capable of heat or flame actuation comprising:
   a cylindrical dispenser body formed to include an internal hammer bore comprising an open end and a closed end;
   a compressed gas cartridge puncture lance slidably disposed within said hammer bore adjacent said open end;
   a lance hammer slidably disposed within said hammer bore between said closed end and said compressed gas cartridge puncture lance, wherein said lance hammer comprises a head having a first diameter and a cylindrical body comprising a distal end and a second diameter and attached to said head with said distal end extending outwardly therefrom, wherein said first diameter is greater than said second diameter, and wherein lance hammer is disposed within said hammer bore such that said head faces said compressed gas cartridge puncture lance, wherein said cylindrical body is formed to include an annular groove in said distal end;
   a spring disposed within said hammer bore between said closed end and said head and around said cylindrical body;
   a hammer retainer comprising a beveled distal end extending through said dispenser body and into said hammer bore, wherein said beveled distal end can extend into said annular groove to retain said lance hammer adjacent said closed end thereby compressing said spring;
   said hammer retainer maintained in place by at least a length of heat-sensitive material in tension;
   whereby heat or flame will cause failure of said heat-sensitive material thereby causing said beveled end to move outwardly from said annular groove, thereby causing said spring to move said lance hammer forwardly to strike said compressed gas cartridge puncture lance and cause said compressed gas cartridge puncture lance to puncture a compressed gas cartridge inserted into said open end of said hammer bore.

2. The compressed gas cartridge dispenser system from claim 1, wherein said heat-sensitive material can be manually cut to cause puncture of said compressed gas cartridge.

3. The compressed gas cartridge dispenser system from claim 1, wherein said open end of said hammer bore is threaded to attach said compressed gas cartridge to said dispenser system.

4. The compressed gas cartridge dispenser system from claim 1, wherein said heat-sensitive material comprises braided or monofilament fibrous material.

* * * * *